(12) United States Patent
Bin et al.

(10) Patent No.: US 8,323,144 B1
(45) Date of Patent: Dec. 4, 2012

(54) DUAL ENGINE HYBRID VEHICLE DRIVE

(75) Inventors: Shi Bin, Cedar Falls, IA (US); Andrew K. Rekow, Cedar Falls, IA (US); Janet R. Willett, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/104,115

(22) Filed: May 10, 2011

(51) Int. Cl.
*B60K 5/08* (2006.01)

(52) U.S. Cl. .................. 477/2; 477/3; 477/7; 180/65.21

(58) Field of Classification Search .................. 477/2, 3, 477/7; 180/65.21, 65.22, 65.31
See application file for complete search history.

(56) References Cited

U.S. PATENT DOCUMENTS

| | | | |
|---|---|---|---|
| 4,588,040 A | 5/1986 | Albright, Jr. et al. | |
| 6,306,056 B1 | 10/2001 | Moore | |
| 6,563,229 B2 * | 5/2003 | Farkas | 290/30 A |
| 6,722,458 B2 * | 4/2004 | Hofbauer | 180/65.25 |
| 6,852,062 B1 * | 2/2005 | Ahner et al. | 477/2 |
| 7,444,944 B2 | 11/2008 | Kumar et al. | |
| 7,591,749 B2 * | 9/2009 | Diemer et al. | 475/5 |
| 7,667,347 B2 | 2/2010 | Donnelly et al. | |
| 2005/0107204 A1 * | 5/2005 | Van Druten et al. | 475/198 |
| 2009/0288899 A1 | 11/2009 | Belloso | |

FOREIGN PATENT DOCUMENTS

| | | |
|---|---|---|
| DE | 4444545 | 6/1995 |
| DE | 202008002402 | 7/2009 |
| EP | 1731345 | 12/2006 |
| WO | 2007138353 | 12/2007 |

OTHER PUBLICATIONS

M. Mohr B. Vahlensieck K. Grad U. Brehmer Electrification and Hybridisation of Powertrains for off-highway machines (15 pages).
EP Search Report (6 pages).

* cited by examiner

*Primary Examiner* — Justin Holmes

(57) ABSTRACT

A vehicle hybrid drive supplies torque to an axle. The drive includes a first engine and a transmission which couples the first engine to the axle. The drive also includes a second engine, a flywheel driven by the second engine, an electric generator driven by the flywheel, a generator controller coupled between the generator and a motor controller, and an electric motor coupled to the motor controller. A gearbox is coupled between the electric motor and the axle. The vehicle drive may also include a further flywheel driven by the first engine, with the transmission being driven by the second flywheel.

2 Claims, 1 Drawing Sheet

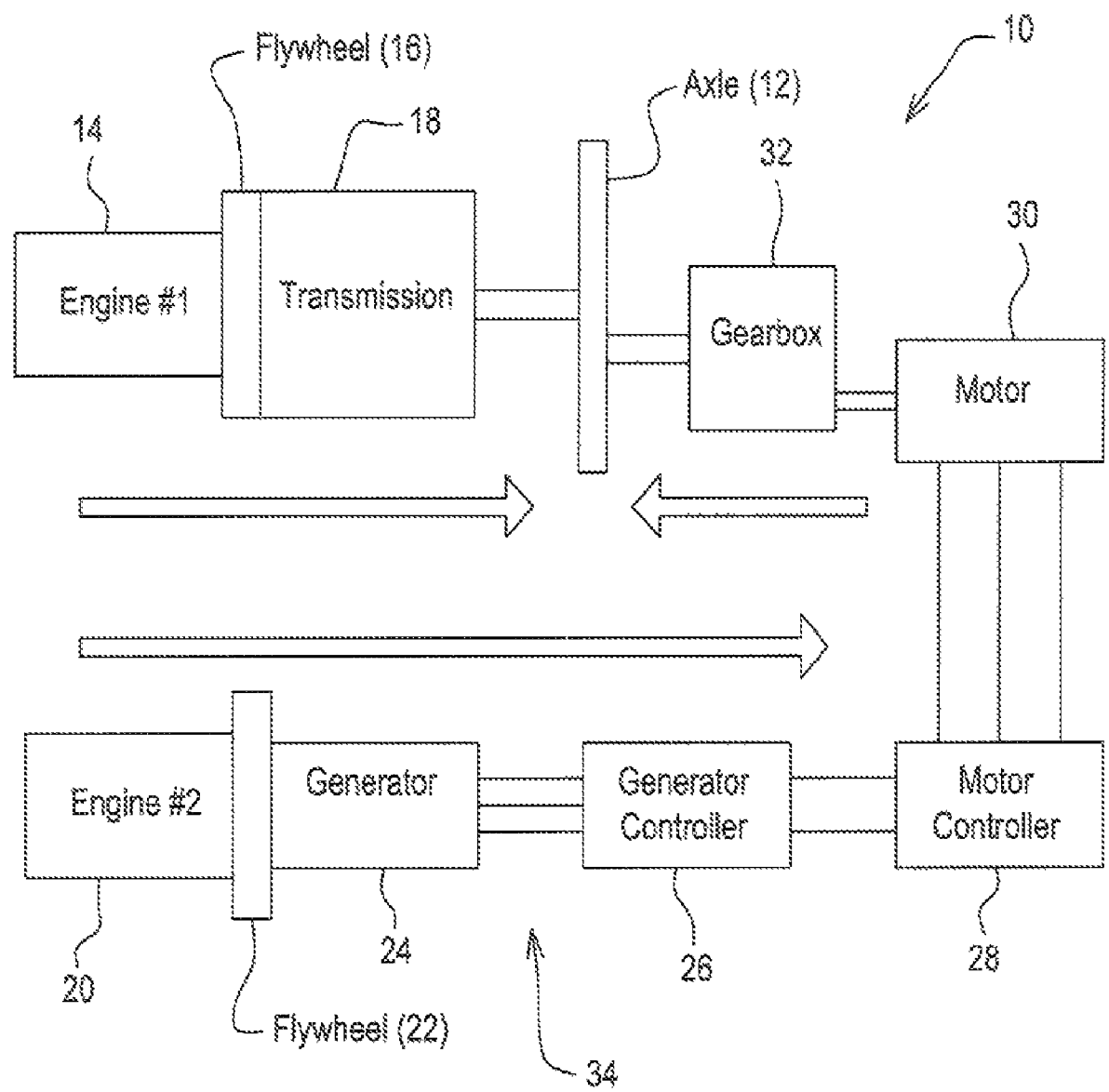

DUAL ENGINE HYBRID VEHICLE DRIVE

FIELD OF THE INVENTION

The present disclosure relates to a dual engine hybrid vehicle drive system.

BACKGROUND OF THE INVENTION

Current engine emissions regulations place significant challenges to the ability for an engine to quickly react to sudden changes in load demand. In order to avoid large particulate emissions, the engine must change operating modes to a significantly higher level of fuel consumption during transient load events in order to meet emissions requirements. This limits the rate at which an engine can respond to the load transient which translates into lower performance for the operator. It would be desirable to have a vehicle drive system which complies with emission regulations and which permits an engine to respond rapidly to changes in load.

SUMMARY

According to an aspect of the present disclosure, a dual engine hybrid vehicle drive system supplies torque to an axle. The drive includes a first engine and a transmission which couples the first engine to the axle. The drive also includes a second engine, a flywheel driven by the second engine, an electric generator driven by the flywheel, a generator controller coupled between the generator and a motor controller, and an electric motor coupled to the motor controller. A gearbox is coupled between the electric motor and the axle. The vehicle drive may also include a further flywheel driven by the first engine, with the transmission being driven by the second flywheel.

BRIEF DESCRIPTION OF THE DRAWINGS

The sole FIGURE is a simplified schematic diagram of a hybrid vehicle drive system embodying the invention.

DETAILED DESCRIPTION OF THE DRAWING

Referring to the sole FIGURE, a vehicle hybrid drive 10 supplies torque to an axle 12 of a vehicle (not shown). The drive 10 includes an internal combustion engine 14 which drives a first flywheel 16. The first flywheel 16 drives a transmission 18. The transmission 18 is drivingly coupled to the axle 12.

The drive 10 also includes a second internal combustion engine 20 which drives a second flywheel 22. The second flywheel 22 drives an electric generator 24. The generator 24 is connected to a generator controller 26. The generator controller 26 is coupled between the generator 24 and a motor controller 28. An electric motor 30 is coupled to, powered by and controlled by the motor controller 28. A gearbox 32 couples the electric motor 30 to the axle 12. The electric generator 24, the generator controller 26, the motor controller 28 and the electric motor 30 form an electric transmission 34.

With this drive 10, the electric motor 30 and the generator 24 can extract kinetic energy stored in rotating flywheel 22 which is driven by the second engine 20 to provide short term torque boost. This can be done in order to 1) allow smoother torque output to the axle 12 while the transmission 18 is in a shifting mode or 2) to allow the second engine 20 to go through a power/torque transient at a slower pace and still support a sharp increase in load torque on the axle 12.

In addition, the electric motor 30 and the generator 24 can recover vehicle kinetic energy from the axle and store it in the second flywheel 22, such as during vehicle slow down or braking. As a result, this drive 10 the engines can operate with higher fuel efficiency. Operator ride comfort is improved because the electric transmission 34 connected to the second engine 20 allows the decoupling of the speed of the second engine 20 from the speed of the axle 12. This enables the energy to be stored by the mechanical flywheel 22 rather than in a more traditional (and less efficient) battery.

The flywheels are mechanical energy storage devices. Alternatively, either or both of the flywheels could be replaced by other energy storage devices, such as batteries or capacitors. The flywheel could be part of the standard flywheel (i.e. where the starter ring attaches) or it could be a separate, heavier or higher speed flywheel.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A vehicle hybrid drive for supplying torque to an axle, the drive comprising:
   a first engine;
   a transmission 18 coupling the first engine to the axle
   a second engine;
   a flywheel driven by the second engine;
   an electric generator driven by the flywheel;
   a generator controller coupled between the generator and a motor controller;
   an electric motor coupled to the motor controller; and
   a gearbox coupling the electric motor to the axle.

2. The vehicle drive of claim 1, further comprising:
   a further flywheel driven by the first engine, the transmission being driven by the further flywheel.

* * * * *